United States Patent
Wolf-Monheim

(10) Patent No.: US 9,783,040 B2
(45) Date of Patent: Oct. 10, 2017

(54) DRIVE WHEEL HAVING AN ELECTRIC WHEEL HUB MOTOR FOR MOTOR VEHICLES AND MOTOR VEHICLE

(71) Applicant: FORD GLOBAL TECHNOLOGIES, LLC, Dearborn, MI (US)

(72) Inventor: Friedrich Peter Wolf-Monheim, Aachen NRW (DE)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 14/816,594

(22) Filed: Aug. 3, 2015

(65) Prior Publication Data
US 2016/0068055 A1   Mar. 10, 2016

(30) Foreign Application Priority Data

Sep. 9, 2014  (DE) .................. 10 2014 217 974

(51) Int. Cl.
*B60K 7/00* (2006.01)
*B60K 1/04* (2006.01)
(Continued)

(52) U.S. Cl.
CPC .............. *B60K 7/0007* (2013.01); *B60K 1/04* (2013.01); *B60L 7/12* (2013.01); *B60L 11/1805* (2013.01);
(Continued)

(58) Field of Classification Search
CPC ............... B60K 2001/045; B60K 1/04; B60K 2007/0038; B60K 2007/0061;
(Continued)

(56) References Cited

U.S. PATENT DOCUMENTS 5,212,026 A *  5/1993  Mitchell ............ H01M 2/1083
                                                   180/68.5
6,092,615 A    7/2000  Pusch et al.
(Continued)

FOREIGN PATENT DOCUMENTS

DE       29808758        9/1999
DE       10214878       10/2003
(Continued)

OTHER PUBLICATIONS

German Examination Report for German Patent Application No. 10 2014 217 974.2 dated May 21, 2015.

*Primary Examiner* — Bryan Evans
(74) *Attorney, Agent, or Firm* — David B. Kelley; Brooks Kushman P.C.

(57) ABSTRACT

A drive wheel having an electric wheel hub motor for a motor vehicle includes a stator arranged around a wheel hub and is connected to the wheel hub in a non-rotatable manner. A rotor is mounted in such a manner that it can rotate relative to the stator to drive a wheel rim connected to the rotor in a non-rotatable manner. At least two energy storage devices are arranged between the wheel hub and the stator to output electrical energy for operation of the electric wheel hub motor. The energy storage devices are embodied in each case in the shape of a ring segment in such a manner that the energy storage devices form a closed ring around the wheel hub when lying adjacent to one another.

14 Claims, 2 Drawing Sheets

(51) Int. Cl.
  *H02K 7/14* (2006.01)
  *H02K 11/00* (2016.01)
  *B60L 7/12* (2006.01)
  *B60L 11/18* (2006.01)

(52) U.S. Cl.
  CPC ............ *B60L 11/1864* (2013.01); *H02K 7/14* (2013.01); *H02K 11/0094* (2013.01); *B60K 2001/045* (2013.01); *B60K 2007/0038* (2013.01); *B60K 2007/0092* (2013.01); *B60L 2220/44* (2013.01); *B60L 2220/50* (2013.01); *Y02T 10/641* (2013.01); *Y02T 10/7005* (2013.01); *Y02T 10/7061* (2013.01)

(58) Field of Classification Search
  CPC .......... B60K 7/0007; B60K 2007/0092; B60L 2220/44; B60L 11/1879; Y02T 10/7005; B62M 6/90; B62M 6/40
  See application file for complete search history.

(56) References Cited

U.S. PATENT DOCUMENTS

| | | | | |
|---|---|---|---|---|
| 6,802,385 B2 * | 10/2004 | Pyntikov | .................. | B62M 6/40 180/220 |
| 2003/0228516 A1 * | 12/2003 | McDermott | ........ | H01M 2/0207 429/160 |
| 2010/0212980 A1 | 8/2010 | Wang | | |

FOREIGN PATENT DOCUMENTS

| | | |
|---|---|---|
| DE | 60204761 | 5/2006 |
| EP | 2423094 | 2/2012 |

\* cited by examiner

DRIVE WHEEL HAVING AN ELECTRIC WHEEL HUB MOTOR FOR MOTOR VEHICLES AND MOTOR VEHICLE

CROSS-REFERENCE TO RELATED APPLICATIONS

This application claims foreign priority benefits under 35 U.S.C. §119(a)-(d) to DE 10 2014 217 974.2 filed Sep. 9, 2014 which is hereby incorporated by reference in its entirety.

TECHNICAL FIELD

The present disclosure relates to a drive wheel having an electric wheel hub motor for motor vehicles including hybrid electric vehicles and electric vehicles.

BACKGROUND

Drive wheels having electric wheel hub motors for motor vehicles are generally known. The electric wheel hub motor renders it possible to transfer a driving force to the drive wheel without having to interconnect a transmission. The drive arrangement using a wheel hub motor is characterized by an essentially more compact construction with respect to a classic drive train that, depending upon the application, comprises required components such as manual or automatic transmissions, drive shafts, differential transmissions and/or drive shafts. In addition, there are entirely new and different possibilities with the aid of the wheel hub motor to design the drive train of a motor vehicle, for example as a hybrid drive or an all-wheel electric drive.

An electric wheel hub motor for a motor vehicle is by way of example disclosed in EP 2 149 470 A1 and said electric wheel hub motor comprises a stator that is fastened to a vehicle axle and a rotor that is arranged on a vehicle wheel rim.

In addition, EP 2 423 094 A2 discloses a drive wheel having an electric wheel hub motor for an electric vehicle, wherein the batteries that are required to operate the electric wheel hub motor are arranged on spokes of a wheel rim. The wheel hub motor sits in the center of the drive wheel and drives the wheel rim including the spokes in a rotating manner.

DE 102 14 878 A1 furthermore describes a golf cart, wherein the running wheels of said golf cart are driven in an electro-motorized manner. The electric motor can be a hub motor or a motor that is arranged in an eccentric manner and that acts upon a pinion on an inner gear ring of the running wheel. At least one battery is arranged in the interior of the running wheel.

SUMMARY

It is to be noted that the features mentioned individually in the description herein can be combined with one another in any technically expedient manner to provide further embodiments of the claimed subject matter that may not be explicitly described or illustrated. The description also characterizes and specifies the representative embodiments in particular in connection with the figures.

In at least one embodiment, a drive wheel having an electric wheel hub motor for a motor vehicle, and also a motor vehicle include a particularly compact and highly integrated construction with which it is possible to achieve a reduction of the production costs and also a reduction of the weight of the vehicle. In addition, the drive wheel and also the motor vehicle render possible an energy-efficient driving operation.

In accordance with various embodiments, a drive wheel having an electric wheel hub motor for a motor vehicle, in particular for a hybrid electric motor vehicle or an electric vehicle, comprises a stator of the electric hub motor that is arranged around a wheel hub of the drive wheel and is connected in a non-rotatable manner to said wheel hub. Furthermore, a rotor of the electric wheel hub motor is arranged around the stator and said rotor is mounted in such a manner that it can rotate relative to the stator. In other words, the stator and also the rotor are embodied in each case in an essentially annular manner, wherein the rotor entirely encompasses the stator. The rotor is used to drive a wheel rim of the drive wheel, said wheel rim being connected in a non-rotatable manner to the rotor. In accordance with at least one embodiment, at least two energy storage devices are arranged between the wheel hub and the stator to output electrical energy for the operation of the electric wheel hub motor and said energy storage devices are embodied in each case in the shape of a ring segment in such a manner that the energy storage devices form a closed ring around the wheel hub when lying adjacent to one another.

The energy storage device can be implemented by a rechargeable battery. However, said rechargeable battery can also be a battery or another previously known energy storage device that is suitable at least so as to output electrical energy to the electric wheel hub motor. The energy storage device may be capable of storing electrical energy that is supplied in any form. For example, if the hybrid electric motor vehicle or the electric vehicle is connected to an electrical charging station that is outside of the vehicle or during a recuperating or regenerating operation of the drive wheel, wherein by way of example braking energy is recouped in the form of electrical energy during a braking operation of the drive wheel.

The drive wheel in accordance with various embodiments provides a particularly compact and highly integrated construction since all the components that are required to drive the drive wheel, in particular the electric wheel hub motor and also the energy storage device, are embodied as components of the drive wheel. It is thus possible to completely pre-assemble the drive wheel including the electric wheel hub motor and also the energy storage device. The drive wheel may be connected to a vehicle wheel axle only by way of the wheel hub for the subsequent mounting on the motor vehicle. In addition, the drive wheel renders possible an energy-efficient operation since only the rotor of the electric wheel hub motor and the wheel rim that is connected to said rotor are driven in a rotatable manner, in other words are accelerated in a rotatable manner. The energy storage devices that are arranged between the non-rotating stator and the non-rotating wheel hub are in contrast only to be accelerated in a linear manner in the case of the motor vehicle moving forwards and not in a rotating manner.

A particularly compact and highly integrated construction of the drive wheel in accordance with one or more embodiments is achieved since the at least two energy storage devices that are arranged between the wheel hub and the stator are embodied in each case in the shape of a ring segment in such a manner that when lying adjacent to one another said ring segments form a closed ring around the wheel hub. For this purpose, the energy storage device can be essentially embodied as V-shaped ring segments when viewed in the cross section and said ring segments form a ring when lying adjacent to one another and said ring entirely surrounds the wheel hub.

In accordance with an advantageous embodiment, an inner circumferential surface of the stator forms an outer wall of each energy storage device. As is mentioned above, since said stator is embodied in an annular manner, the stator comprises an inner circumferential surface and an outer circumferential surface, wherein the inner circumferential surface preferably forms the outer surface of each energy storage device. This embodiment renders it possible in addition to a more compact construction of the drive wheel to likewise reduce the weight of the drive wheel since the inner circumferential surface of the stator simultaneously forms both a wall for the stator as well as a wall for the energy storage device.

A further advantageous embodiment provides that an outer circumferential surface of the wheel hub forms an inner wall of each energy storage device. The wheel hub is also, as is previously mentioned above, embodied in an essentially annular manner and comprises an outer circumferential surface and also an inner circumferential surface. This embodiment renders it possible, in addition to a compact construction of the drive wheel, to likewise reduce its weight since the outer circumferential surface of the hub simultaneously forms both a wall for the wheel hub as well as a wall for the energy storage device. The inner circumferential surface of the wheel hub can be fitted to a vehicle wheel axle so as to fasten the drive wheel to the motor vehicle and said inner circumferential surface can be connected in a non-rotatable manner to said vehicle wheel axle.

In accordance with a further advantageous embodiment, at least one power control device for controlling the electrical supply to the electric wheel hub motor from an energy storage device is attached to one or multiple energy storage devices. A cable guide between the power control device, the electric wheel hub motor and the one or multiple energy storage devices can consequently be embodied entirely on the drive wheel.

In one embodiment, the rotor is mounted in a rotatable manner on an outer circumferential surface of the (essentially annular) stator by means of at least one mounting unit that is arranged between the rotor and the stator, said mounting unit being by way of example a rolling or roller bearing. It is possible in this manner to construct the drive wheel in accordance with the embodiments in a more compact and lighter manner since an additional mounting arrangement of the rotor on the wheel hub can be omitted.

In a still further advantageous embodiment, the rotor forms the wheel rim of the drive wheel. As a consequence, the weight of the drive wheel is further reduced since it is not necessary to provide an additional wheel rim for the drive wheel. Accordingly in a further embodiment, a rubber tire is attached in a non-rotatable manner to an outer circumferential surface of the rotor.

In accordance with a further aspect of various embodiments, a motor vehicle, in particular a hybrid electric motor vehicle or an electric motor vehicle comprises at least one drive wheel in accordance with one of the above described embodiments. In order to avoid repetitions, reference is made at this point with regard to the advantages of the motor vehicle that is embodied in this manner to the above descriptions relating to the drive wheel.

Further features and advantages are evident in the description herein of a representative embodiment that is not to be understood as limiting and that is further explained with reference to the drawings.

DETAILED DESCRIPTION

Figure 1:
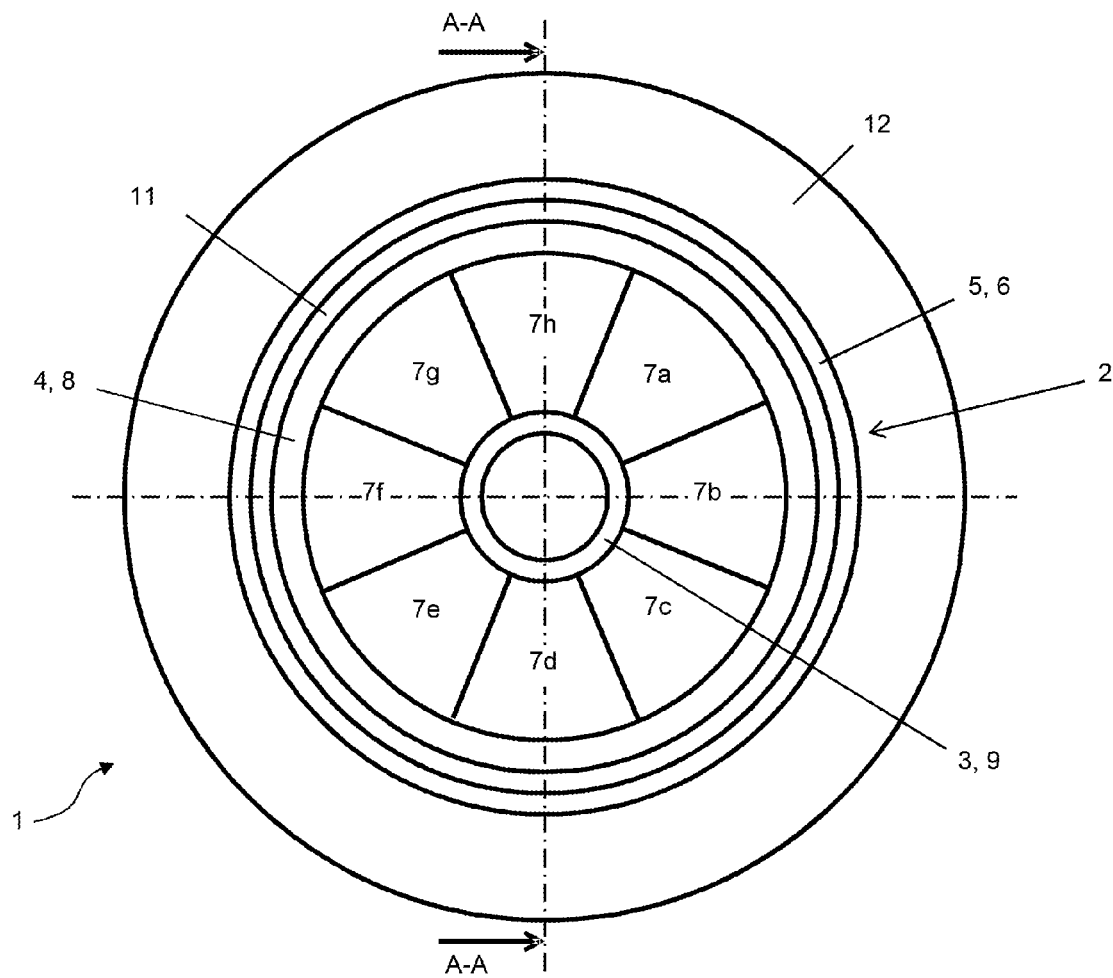
FIG. 1 illustrates schematically a side view of a representative embodiment of a drive wheel in accordance with the claimed subject matter.

As required, detailed embodiments are disclosed herein; however, it is to be understood that the disclosed embodiments are merely representative examples that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the embodiments.

In the different figures, parts that are identical with regard to their function are provided with the same reference numeral so that the parts are generally also only described once.

FIG. 1 illustrates a side view of a representative embodiment of a drive wheel 1 having an electric wheel hub motor 2 for a motor vehicle in accordance with the disclosure. As is evident in FIG. 1, the drive wheel 1 comprises an annular wheel hub 3, around which is arranged an annular stator 4. The stator 4 is connected to the wheel hub in a non-rotating manner. Furthermore, an annular rotor 5 is arranged around the stator 4. The rotor 5 is mounted in such a manner that it can rotate relative to the stator 4. In the case of the representative embodiment of the drive wheel 1 that is illustrated in FIG. 1, the rotor 5 is simultaneously embodied as the wheel rim 6. In other words, the rotor 5 and the wheel rim 6 form a single-piece unit in the case of the drive wheel 1 that is illustrated in FIG. 1. However, the wheel rim 6 could also be embodied as a separate component that would be connected in this case to the rotor 5 in a non-rotatable manner.

Furthermore, it is evident in FIG. 1 that a total of eight energy storage devices 7, individually 7a, 7b, 7c, 7d, 7e, 7f, 7g and 7h, are arranged between the wheel hub 3 and the stator 4 to output electrical energy for the operation of the electric wheel hub motor 2. In the case of the drive wheel 1 that is illustrated in FIG. 1, the energy storage devices 7a, 7b, 7c, 7d, 7e, 7f, 7g and 7h are in each case a rechargeable battery. Each individual energy storage device 7a, 7b, 7c, 7d, 7e, 7f, 7g and 7h, is embodied in each case in the shape of a ring segment or rather is V-shaped in its cross-section when viewed in the side view of FIG. 1. When lying adjacent to one another, as is illustrated in FIG. 1, the individual energy storage devices 7a, 7b, 7c, 7d, 7e, 7f, 7g and 7h, form a closed ring that is arranged around the wheel hub 3 and that entirely surrounds the wheel hub 3.

It is particularly advantageous in the case of the exemplary embodiment of the drive wheel 1 that is illustrated in FIG. 1 that an inner circumferential surface of the annular stator 4 simultaneously forms an outer wall 8 of each energy storage device 7a, 7b, 7c, 7d, 7e, 7f, 7g and 7h. In addition, in the case of the illustrated drive wheel 1, an outer circumferential surface of the annular wheel hub 3 forms an inner wall 9 of each energy storage device 7a, 7b, 7c, 7d, 7e, 7f, 7g and 7h.

Figure 2:
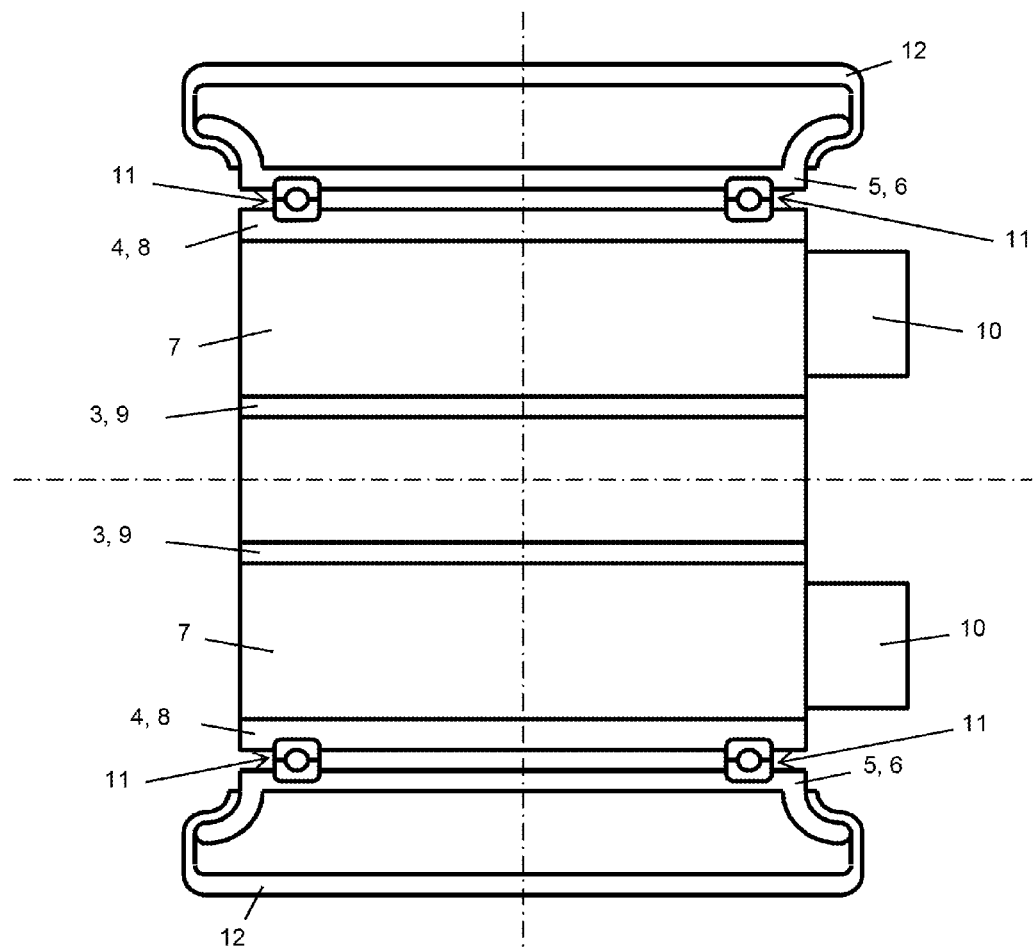
FIG. 2 illustrates schematically a cross-sectional view of the drive wheel in FIG. 1 as viewed from the front along the Line A-A that is illustrated in FIG. 1.

FIG. 2 illustrates a cross sectional view of the drive wheel 1 from FIG. 1 as viewed from the front along the line A-A that is illustrated in FIG. 1. A power control device 10 for controlling the electrical supply to the electric wheel hub motor 2 from an energy storage device 7a, 7b, 7c, 7d, 7e, 7f, 7g and 7h, is evident in FIG. 2. The power control device 10 can be attached to one or multiple energy storage devices 7a, 7b, 7c, 7d, 7e, 7f, 7g and 7h.

In addition, it is evident in FIG. 2 that the rotor 5 is mounted on an outer circumferential surface of the annular stator 4 in a rotatable manner by the two annular mounting units 11 that are arranged between the rotor 5 and the stator 4 and that are embodied as ball bearings in the case of the illustrated exemplary embodiment. The mounting units 11 are preferably rolling bearing units, wherein however said units are not limited to the ball bearing that is illustrated in FIG. 2.

Since, in the case of the representative embodiment of the drive wheel 1 that is illustrated in FIG. 1 and FIG. 2, the rotor 5 simultaneously forms the wheel rim 6, a rubber tire 12 is preferably directly attached in a non-rotatable manner to an outer circumferential surface of the rotor 5.

The drive wheel 1 can be fitted with its annular wheel hub 3 onto a vehicle wheel axle (not illustrated) and said drive wheel can be connected in a non-rotatable manner to said vehicle wheel axle.

The drive wheel and motor vehicle in accordance with various embodiments were further explained with reference to a representative embodiment that is illustrated in the figures. However, the above described drive wheel and motor vehicle are not limited to the representative embodiment that is disclosed in this case, rather said drive wheel and motor vehicle also comprise further embodiments.

In one embodiment, the drive wheel includes an electric wheel hub motor to drive a motor vehicle, in particular a hybrid electric motor vehicle or an electric vehicle.

While exemplary embodiments are described above, it is not intended that these embodiments describe all possible forms of the claimed subject matter. Rather, the words used in the specification are words of description rather than limitation, and it is understood that various changes may be made without departing from the spirit and scope of the claimed subject matter.

What is claimed is:

1. A drive wheel having a wheel hub motor, comprising:
a stator non-rotatably mounted to a wheel hub;
a rotor rotatably mounted to the stator, and having an outer circumference configured to receive a tire; and
batteries arranged between the wheel hub and the stator to power the wheel hub motor, each of the batteries shaped as ring segments contacting one another and with arcuate inner walls forming a closed ring around the wheel hub.

2. The drive wheel of claim 1, wherein an inner circumferential surface of the stator forms an outer wall of the batteries.

3. The drive wheel of claim 1, wherein an outer circumferential surface of the wheel hub forms an inner wall of the batteries.

4. The drive wheel of claim 1 further comprising at least one power control device attached to at least one of the batteries to control electrical energy supplied from each of the batteries to the wheel hub motor.

5. The drive wheel of claim 1, wherein the rotor is mounted in a rotatable manner on an outer circumferential surface of the stator using at least one roller bearing arranged between the rotor and the stator.

6. The drive wheel of claim 1 further comprising a rubber tire secured in a non-rotatable manner to an outer circumferential surface of the rotor.

7. A drive wheel, comprising:
a wheel hub;
a stator non-rotatably mounted to the wheel hub;
a rotor rotatably mounted to the stator and having an outer rim configured to receive a tire; and
batteries, each comprising an annular sector contacting adjacent batteries and forming a closed ring of segments around the wheel hub to electrically power a wheel motor comprising the stator and the rotor.

8. The drive wheel of claim 7 further comprising a rubber tire mounted to the rotor.

9. The drive wheel of claim 7 further comprising a controller electrically connected to at least two of the batteries and configured to control electrical power to the wheel motor.

10. The drive wheel of claim 9 wherein the controller is mounted to at least one of the batteries.

11. The drive wheel of claim 7 further comprising:
a tire mounted to the outer rim of the rotor.

12. A vehicle drive wheel, comprising:
a motor including a stator configured for non-rotatable mounting to a wheel hub, and a rotor rotatably mounted to the stator by at least one bearing therebetween, the rotor having a rim configured to receive a tire; and
a plurality of batteries each shaped as an annular segment and contacting one another to form a closed ring around the wheel hub, the batteries configured for connection to the motor.

13. The vehicle drive wheel of claim 12 further comprising a controller electrically connected to the plurality of batteries and the motor, the controller configured to control electrical energy flow between the batteries and the motor.

14. The vehicle drive wheel of claim 13 wherein the controller is mounted to at least one of the plurality of batteries.

* * * * *